(12) United States Patent
Chen et al.

(10) Patent No.: US 6,364,292 B1
(45) Date of Patent: Apr. 2, 2002

(54) SHOCK ABSORBER FOR SADDLE OF BICYCLE

(76) Inventors: Wen-Tsung Chen, 339, Chung Hsi Road, Hsi Hu Town Changhua (TW); Mu-Tsung Chen, 11, Lane 109, Hsiang Yang Road, Changhua (TW)

( * ) Notice: Subject to any disclaimer, the term of this patent is extended or adjusted under 35 U.S.C. 154(b) by 0 days.

(21) Appl. No.: 09/629,864

(22) Filed: Aug. 1, 2000

(30) Foreign Application Priority Data

Aug. 16, 2000 (TW) .......................................... 89212449

(51) Int. Cl.[7] .................................................. A47C 7/14
(52) U.S. Cl. ..................................... 267/131; 297/195.1
(58) Field of Search .......................... 297/195.1, 258.1; 267/132, 131; 248/600

(56) References Cited

U.S. PATENT DOCUMENTS

| | | | |
|---|---|---|---|
| 4,455,010 A | * | 6/1984 | Butler |
| 5,020,851 A | * | 6/1991 | Chen |
| 5,370,351 A | * | 12/1994 | Chen |
| 5,443,301 A | * | 8/1995 | Lai |
| 5,464,271 A | * | 11/1995 | McFarland |
| 5,702,093 A | * | 12/1997 | Liao |

FOREIGN PATENT DOCUMENTS

DE 3345981 * 6/1985

\* cited by examiner

*Primary Examiner*—Milton Nelson, Jr.
(74) *Attorney, Agent, or Firm*—Bacon & Thomas, PLLC

(57) ABSTRACT

A shock absorber for a saddle of a bicycle. The shock absorber includes an elastic member around a seat post near the saddle. Thee are two spaced through holes provided in the shock absorber with perpendicular orientation therebetween. When the saddle is vibrated one of the holes is expanded, while the other opposite hole is compressed.

3 Claims, 5 Drawing Sheets

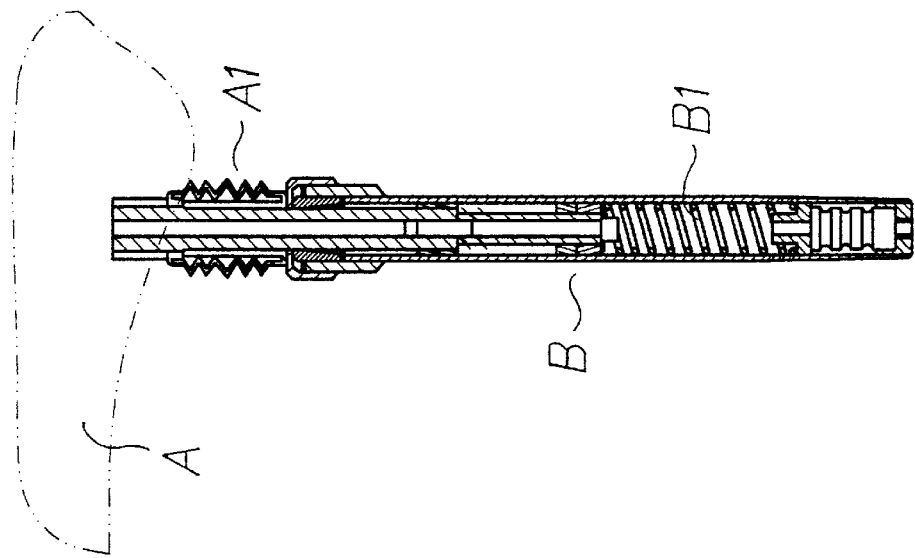
FIG.1-B
PRIOR ART
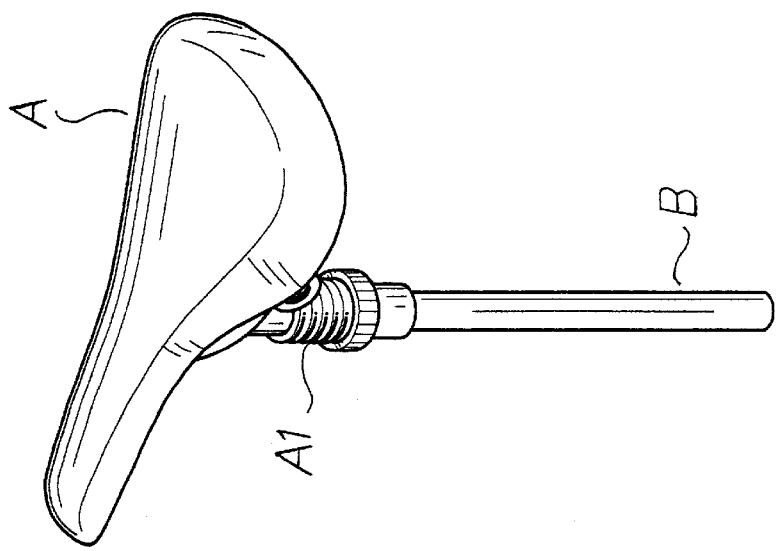
FIG.1-A
PRIOR ART

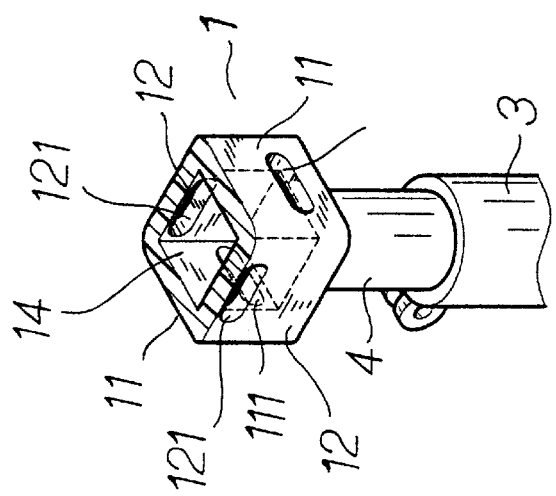
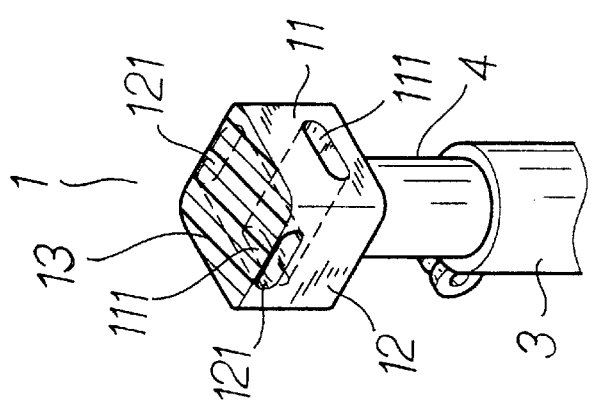
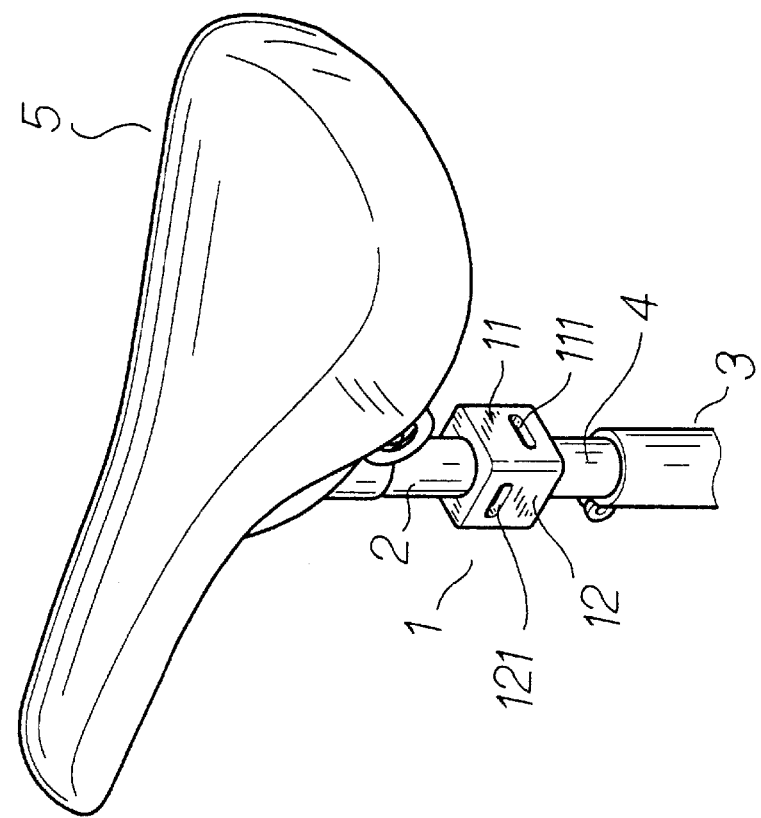
FIG. 2-A  FIG. 2-B  FIG. 2-C

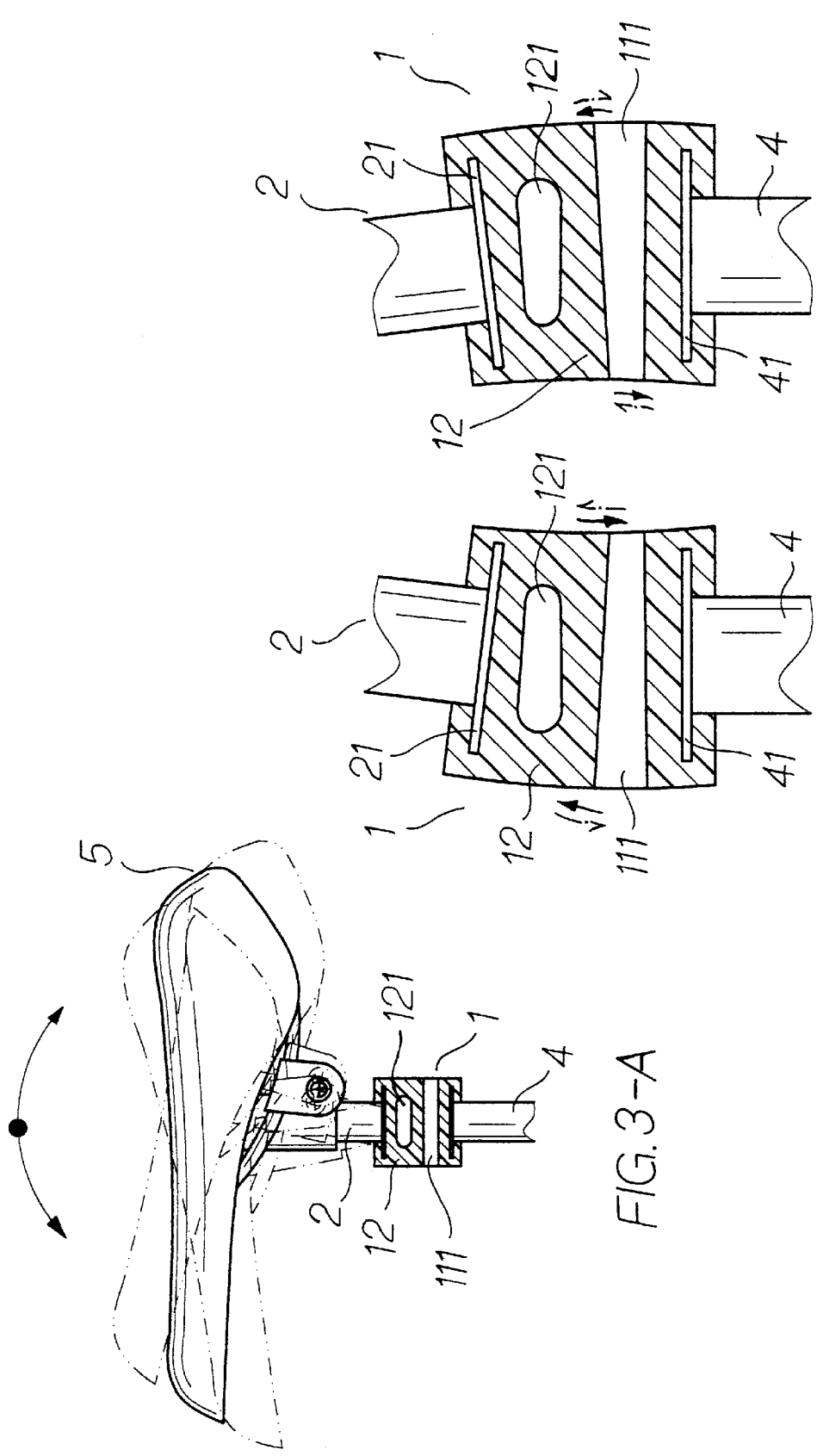

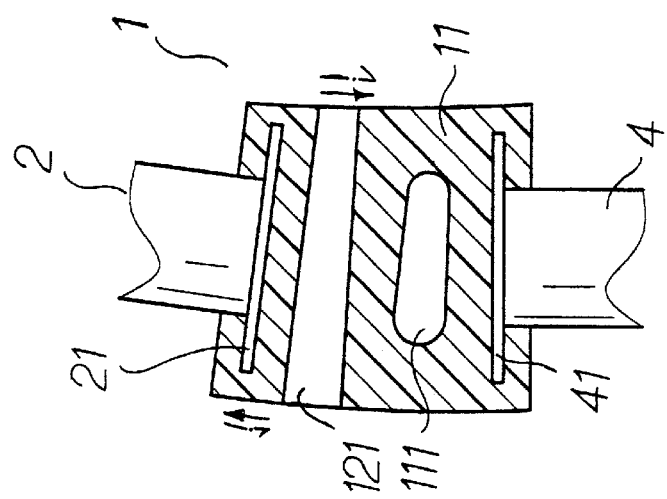
FIG. 4-C
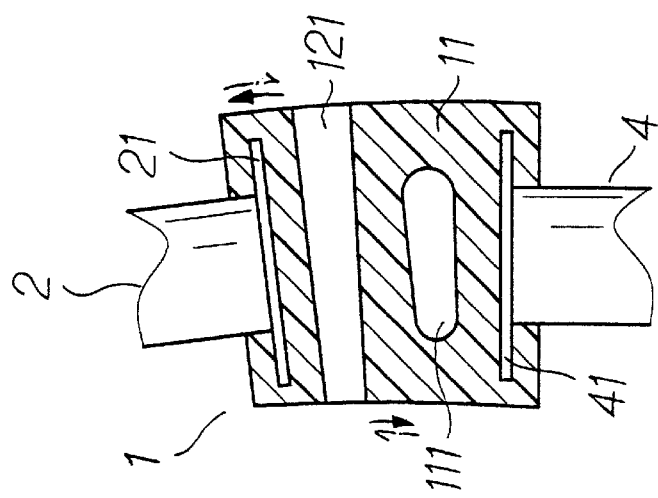
FIG. 4-B
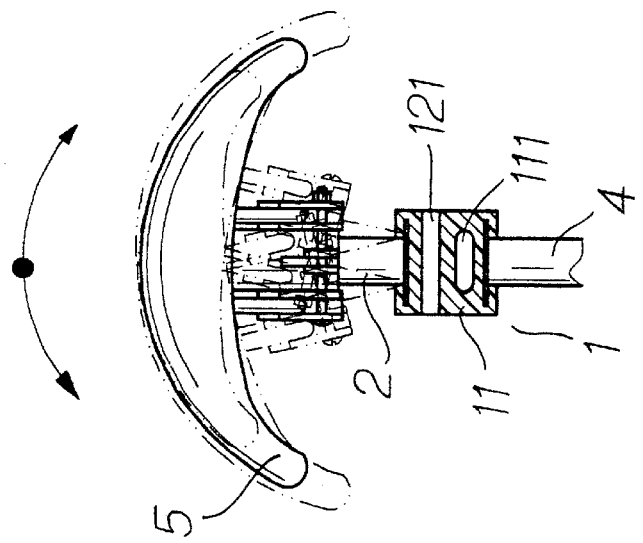
FIG. 4-A

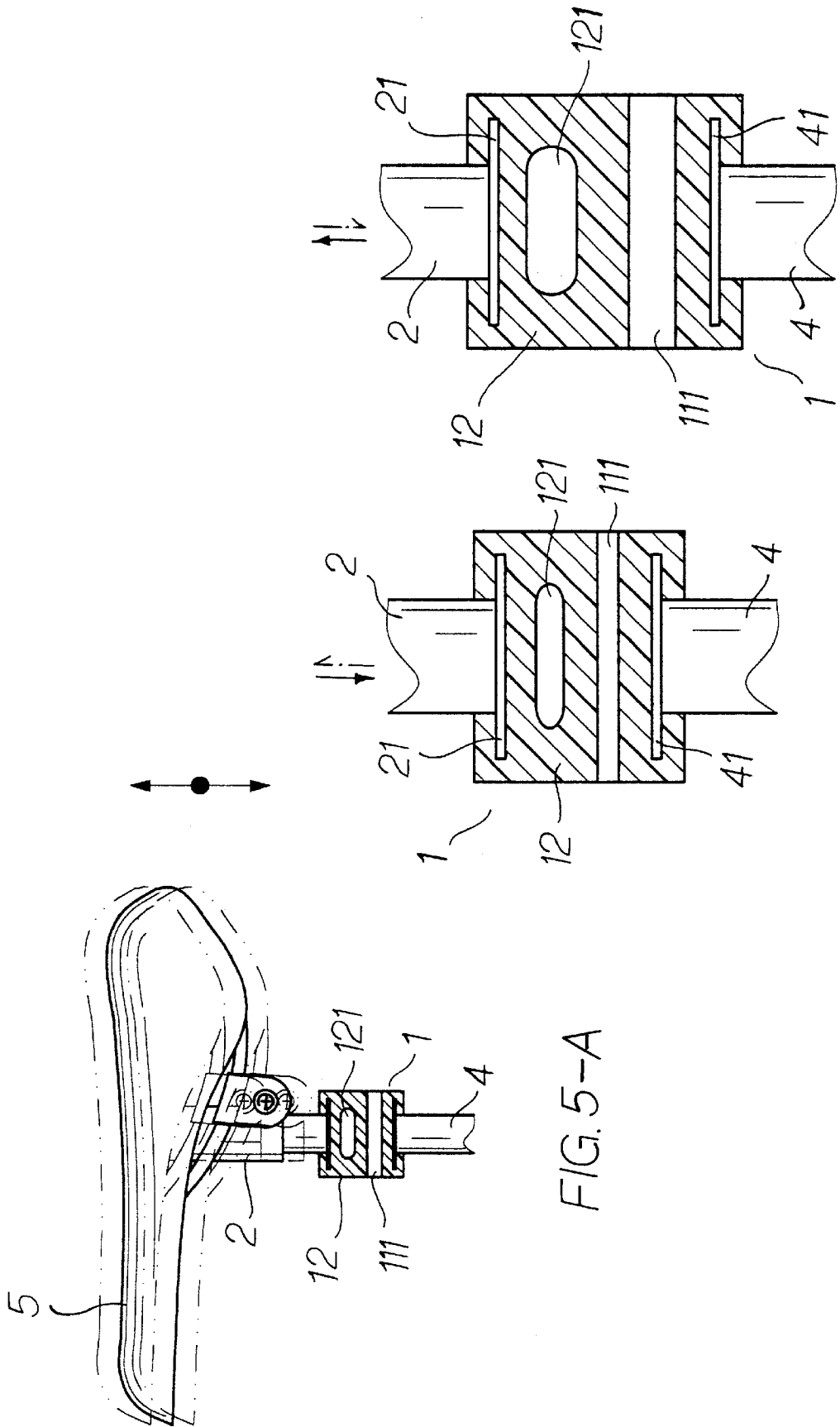

SHOCK ABSORBER FOR SADDLE OF BICYCLE

FIELD OF THE INVENTION

The present invention relates to shock absorber and more particularly to a shock absorber for saddle of bicycle having improved characteristics.

BACKGROUND OF THE INVENTION

A conventional shock absorber for saddle of bicycle is shown in FIGS. 1A and 1B wherein a spring member A1 is put on upper part of seat post B and a helical spring B1 is provided in the hollow seat post B having a lower end coupled to a fixed member within seat post B and an upper end coupled to an up-and-down moveable member which is in turn coupled to saddle A. With this, a shock is occurred for example, when an irregularity (e.g., crack, pebble, slope) is encountered, the shock absorber as configured above may absorb the shock That is, saddle A may up-and-down vibrate smoothly for giving some degree of comfort to rider.

However, the previous design suffered from several disadvantages. For example, the fact is that bicycle itself may also vibrate when above shock occurs. As such, the hip of rider may still suffer a strong impact by such vibration. It is common for a rider to lift his/her hip above saddle A in advance when an irregularity is expected to encounter. In brief, such prior art is designed to absorb the shock in the vertical direction only. Further, the shock absorption feature available in such bicycles is not good enough. Furthermore, in the case of climbing a slope rider often feels uncomfortable because saddle A is not automatically instantly adapted to such occasion. Rider may feel a similar uncomfortableness when riding on a descending road.

Thus, it is desirable to provide a novel shock absorber for saddle of bicycle in order to overcome the above drawbacks of prior art.

SUMMARY OF THE INVENTION

It is an object of the present invention to provide a shock absorber for saddle of bicycle. The shock absorber is implemented as an elastic member around the joint of upper seat post and lower seat post near saddle. Upper seat post has a top end coupled to saddle and a bottom circumferential plate on the upper part of elastic member. Lower seat post is slidable in a seat tube. Lower seat post has a top circumferential plate on the lower part of elastic member. There are two spaced through holes provided in the shock absorber with perpendicular orientation therebetween. In a case of vibration such as up and down, left and night, or back and forth of the bicycle, one portions of holes are expanded, while the other opposite portions of holes are compressed. As such, a shock absorption effect is obtained for giving some degree of comfort to rider.

The above and other objects, features and advantages of the present invention will become apparent from the following detailed description taken with the accompanying drawings.

BRIEF DESCRIPTION OF THE DRAWINGS

FIG. 1A is a perspective view of a conventional saddle of bicycle equipped with a shock absorber;

FIG. 1B is a cross-sectional view of FIG. 1A;

FIG. 2A is a perspective view of a saddle of bicycle incorporating a shock absorber according to the invention;

FIG. 2B is a perspective view of a first preferred embodiment of shock absorber of FIG. 2A, FIG. 2C is a perspective view of a second preferred embodiment of shock absorber of FIG. 2A;

FIG. 3A is a side view in part section illustrating the back and forth vibration of the FIG. 2A saddle;

FIG. 3B is a cross-sectional view illustrating the deformed shock absorber of FIG. 2A when saddle vibrates forward;

FIG. 3C is a cross-sectional view illustrating the deformed shock absorber of FIG. 2A when saddle vibrates backward;

FIG. 4A is a side view in part section illustrating the left and right vibration of the FIG. 2A saddle;

FIG. 4B is a cross-sectional view illustrating the deformed shock absorber of FIG. 2A when saddle vibrates leftward;

FIG. 4C is a cross-sectional view illustrating the deformed shock absorber of FIG. 2A when saddle vibrates rightward;

FIG. 5A is a side view in part section illustrating the up and down vibration of the FIG. 2A saddle;

FIG. 5B is a cross-sectional view illustrating the deformed shock absorber of FIG. 2A when saddle vibrates upward; and FIG. 5C is a cross-sectional view illustrating the deformed shock absorber of FIG. 2A when saddle vibrates downward.

DETAILED DESCRIPTION OF THE PREFERRED EMBODIMENTS

Referring to FIGS. 2A and 2B, there is shown a saddle 5 of bicycle incorporating a shock absorber according to the invention. The shock absorber is implemented as an elastic member 1 around the joint of upper seat post 2 and lower seat post 4 near saddle 5. Upper seat post 2 has a top end coupled to saddle 5 and a bottom circumferential plate 21 provided on the upper part of elastic member 1. Lower seat post 4 is slidable in a seat tube 3 for adjusting the height of saddle 5. Lower seat post 4 also has a top circumferential plate 41 provided on the lower part of elastic member 1. Elastic member 1 is made of rubber or plastic. In this embodiment, elastic member 1 does not have a longitudinal through portion Instead, there are two spaced through holes 111 and 121 with perpendicular orientation therebetween wherein hole 111 is provided from front side 11 to rear side 11 and hole 121 is provided from left side 12 to right side 12.

The operations of the shock absorber of the invention is detailed below.

as Referring to FIGS. 3A, 3B, and 3C, a back and forth vibration is shown when an irregularity (e.g., crack, ascending road, descending road) is encountered. In the case of forward vibration (ascending road), the rear portions of holes 111 and 121 are expanded, while the front portions of holes 111 and 121 are compressed (FIG. 3B). As such, the shock absorber may absorb the vibration smoothly for giving some degree of comfort to rider. In the case of backward vibration (descending road), the rear portions of holes 111 and 121 are compressed, while the front portions of holes 111 and 121 are expanded (FIG. 3C). As such, the shock absorber may also absorb the vibration smoothly for giving some degree of comfort to rider.

Referring to FIGS. 4A, 4B, and 4C, a left and right vibration is shown when an irregularity (e.g., crack, pebble)

is encountered on the road. Likewise, the same shock absorption effect as the case of FIG. 3 is obtained by the shock absorber of the invention, thus a detailed description is omitted herein for the sake of brevity.

Referring to FIGS. 5A, 5B, and 5C, an up and down vibration is shown when an irregularity (e.g., crack, pebble) is encountered on the road. Likewise, the same shock absorption effect as the case of FIG. 3 is obtained by the shock absorber of the invention, thus a detailed description is omitted herein for the sake of brevity.

Referring to FIG. 2C, top and bottom sides 13 of elastic member 1 may be recessed to form a through opening 14 in a second embodiment. This can obtain a similar shock absorption effect as that described above in the first embodiment. It is appreciated by those skilled in the art that any of other suitable shapes of elastic member 1 may be used without departing from the scope and spirit of the invention.

While the invention herein disclosed has been described by means of specific embodiments, numerous modifications and variations could be made thereto by those skilled in the art without departing from the scope and spirit of the invention set forth in the claims.

What is claimed is:

1. A shock absorber for a saddle of a bicycle, the shock absorber comprising:

an upper seat post, one end of the upper seat post securable to a saddle of a bicycle and another end of the upper seat post secured to a bottom circumferential plate;

a lower seat post, one end of the lower seat post securable to a seat tube of a bicycle and another end of the lower seat post secured to a top circumferential plate;

the bottom circumferential plate and the top circumferential plate are spaced apart from one another;

an elastic member secured between the upper seat post and the lower seat post, with the elastic member attached to both the bottom circumferential plate and the top circumferential plate, the elastic member comprising upper and lowerthrough holes that are spaced apart, the through holes are positioned between the upper seat post and the lower seat post, and the through holes are arranged substantially perpendicular from one another; and wherein when the shock absorber is vibrated, opposing ends of the through holes are expanded or compressed.

2. The shock absorber for a saddle of a bicycle, as claimed in claim 1 wherein the elastic member further comprises a longitudinal through opening formed therein.

3. The shock absorber for a saddle of a bicycle, as claimed in claim 1 wherein the elastic member comprises a parallelpiped shape.

* * * * *